United States Patent
Flechtner et al.

(10) Patent No.: US 7,363,116 B2
(45) Date of Patent: Apr. 22, 2008

(54) METHOD FOR DETERMINING THE MASS OF A MOTOR VEHICLE WHILE TAKING INTO ACCOUNT DIFFERENT DRIVING SITUATIONS

(75) Inventors: Horst Flechtner, Garching (DE); Axel Pauly, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 229 days.

(21) Appl. No.: 10/806,273

(22) Filed: Mar. 23, 2004

(65) Prior Publication Data

US 2004/0181317 A1 Sep. 16, 2004

Related U.S. Application Data

(63) Continuation of application No. PCT/EP02/08616, filed on Aug. 2, 2002.

(30) Foreign Application Priority Data

Sep. 28, 2001 (DE) ................ 101 48 091

(51) Int. Cl.
G06F 19/00 (2006.01)
(52) U.S. Cl. .................. 701/1; 303/132; 303/121; 702/141
(58) Field of Classification Search ........ 701/41, 701/50, 80, 97, 1, 70; 180/65.1, 6.44, 197; 188/174; 324/300; 702/42, 173, 141; 73/865; 303/132, 121, 167
See application file for complete search history.

(56) References Cited

U.S. PATENT DOCUMENTS

| | | | | |
|---|---|---|---|---|
| 5,485,381 A | * | 1/1996 | Heintz et al. ............... 701/93 |
| 5,598,335 A | * | 1/1997 | You ........................... 701/65 |
| 5,832,400 A | * | 11/1998 | Takahashi et al. .......... 701/53 |
| 6,059,379 A | * | 5/2000 | Deml et al. ................. 303/15 |
| 6,278,912 B1 | * | 8/2001 | Amano ........................ 701/1 |
| 6,314,383 B1 | * | 11/2001 | Leimbach et al. ......... 702/173 |
| 6,332,354 B1 | * | 12/2001 | Lalor et al. ................. 73/121 |
| 6,374,171 B2 | * | 4/2002 | Weiberle et al. ............ 701/71 |
| 6,438,510 B2 | * | 8/2002 | Zhu et al. .................. 702/175 |
| 6,754,615 B1 | * | 6/2004 | Germann et al. ............ 703/8 |

(Continued)

FOREIGN PATENT DOCUMENTS

DE 40 15 320 C2 5/1990

(Continued)

OTHER PUBLICATIONS

International Search Report, Dec. 18, 2002.

(Continued)

Primary Examiner—Tuan C To
(74) Attorney, Agent, or Firm—Crowell & Moring LLP

(57) ABSTRACT

A method for determining the mass of a motor vehicle while taking different driving situations into consideration, involving an evaluation of a vehicle acceleration, wherein apart from a driving force of a vehicle drive unit, resistance forces resulting from rotational forces, air resistance, rolling resistance, the slope descending force and a braking force are taken into consideration. Additionally, a multitude of different driving situations may be evaluated, wherein the individual results are stored and combined suitably into a collective mass value. Further, different driving situations can be weighted differently in determining the mass value.

12 Claims, 1 Drawing Sheet

U.S. PATENT DOCUMENTS

| | | | |
|---|---|---|---|
| 2001/0005805 A1* | 6/2001 | Saotome et al. | 701/67 |
| 2001/0029419 A1* | 10/2001 | Matsumoto et al. | 701/80 |
| 2002/0008423 A1* | 1/2002 | Yasui et al. | 303/9.62 |
| 2003/0040861 A1* | 2/2003 | Bellinger et al. | 701/51 |

FOREIGN PATENT DOCUMENTS

| | | |
|---|---|---|
| DE | 197 28 867 A1 | 7/1997 |
| DE | 196 03 430 A | 8/1997 |
| DE | 198 02 630 A1 | 1/1998 |
| DE | 197 55 112 A | 6/1998 |
| DE | 197 04 954 A | 8/1998 |
| DE | 197 24 092 A | 12/1998 |
| DE | 199 55 094 A | 5/2001 |
| DE | 100 39 458 A | 7/2001 |
| EP | 0 932 033 A | 7/1999 |

OTHER PUBLICATIONS

German Search Report, Jun. 61, 2002.

* cited by examiner

METHOD FOR DETERMINING THE MASS OF A MOTOR VEHICLE WHILE TAKING INTO ACCOUNT DIFFERENT DRIVING SITUATIONS

The present application is a continuation of International Patent Application No. PCT/EP02/08616, filed Aug. 2, 2002, designating the United States of America and published in German as WO 03/029764 A1, the entire disclosure of which is incorporated herein by reference.

BACKGROUND AND SUMMARY OF THE INVENTION

The invention relates to a method for determining the mass of a motor vehicle while taking into account different driving situations. The method involves the evaluation of the respective vehicle acceleration, whereby in addition to the driving force of a vehicle drive unit the respective resistance forces resulting from rotational forces, from the air resistance, from the rolling resistance and from the slope descending force are taken into account. In addition to DE 197 24 092 A1 please refer in particular to DE 197 28 867 A1 for the technical scope.

For instance, for more complex chassis control systems under development it is desired or even necessary to have knowledge available regarding the current mass or the current weight of a motor vehicle, also of a passenger motor vehicle. Naturally the total weight of a specific vehicle depending on the load condition and on the fill level in particular of the fuel tank can vary over a relatively wide range. At first view, the easiest solution for determining the vehicle weight is using a suitable load-sensing device attached in the wheel suspension, however this is not practical for series production for cost reasons among other things. The same is true for pressure measurement in a vehicle's pneumatic suspension system if the vehicle is equipped with a pneumatic suspension system at all.

For example from the above mentioned documents another approach is known, however up to now it has been tested only with commercial vehicles such as heavy goods vehicles or the like. With the second mentioned DE 197 28 867 A1 a mass value representing the vehicle mass of a commercial vehicle equipped with a drive unit is determined by recording at least a first as well as a second acceleration value of the vehicle. These acceleration values represent the vehicle acceleration at a first and a second point in time at which the drive values representing the driving force or the driving torque are recorded. At least depending on the recorded acceleration values and the recorded drive values then at least a first and a second driving resistance value will be identified. Thereby the vehicle mass value is determined as a function of a comparison of at least the first identified vehicle resistance or estimated mass value with the second identified vehicle or estimated mass value. This comparison enables the recognition of a roadway gradient through which an incorrect mass identification caused by the roadway gradient is supposed to be prevented.

According to the first DE 197 24 092 A1 mentioned above the vehicle mass of a commercial vehicle with a towing vehicle and a trailer or semi-trailer, comprising an activatable braking device that acts upon the wheels of the towing vehicle and trailer/semi-trailer, is also determined through the vehicle acceleration. An initial acceleration value is recorded that represents the vehicle acceleration before activation of the brake device, as is at least a second acceleration value that represents the vehicle acceleration after activation of the brake device. The vehicle mass or a signal representing the vehicle mass is then determined or generated as a function of the first and second recorded acceleration values.

Based on the fact that these familiar mass determination methods or mass estimation methods have only been tested for relatively heavy commercial vehicles, it can be concluded that these methods are relatively inaccurate, i.e. that a relative large dispersion of the measurement results occurs. However this can be tolerated with large commercial vehicles whose empty weight and load weight significantly differ from one another. Significantly more accurate results should be provided by such a method for passenger vehicles since otherwise such a calculation practically would not need to be conducted, but rather an approximation value could be simply used that would be formed from the empty weight as well as an average payload.

Therefore it is the object of the present invention to further expand a method for determining the mass of a motor vehicle while taking different driving situations into consideration, involving an evaluation of a vehicle acceleration, wherein apart from a driving force of a vehicle drive unit, resistance forces resulting from rotational forces, air resistance, rolling resistance, the slope descending force and a braking force are taken into consideration, to the effect that a sufficiently accurate mass estimation can be made possible based virtually on the information that is already available in the vehicle or can be obtained through a suitable sensor or signal evaluation.

The solution to this object is characterized in that in the same approach the respective braking force is also taken into account. Particularly good results will be obtained thereby when a multitude of different driving situations is evaluated, whereby the individual results are each stored and combined to form a collective mass value. Thereby the proposed method can be further improved when the individual results are weighted differently. Additional embodiments are discussed herein.

DETAILED DESCRIPTION

Figure 1:
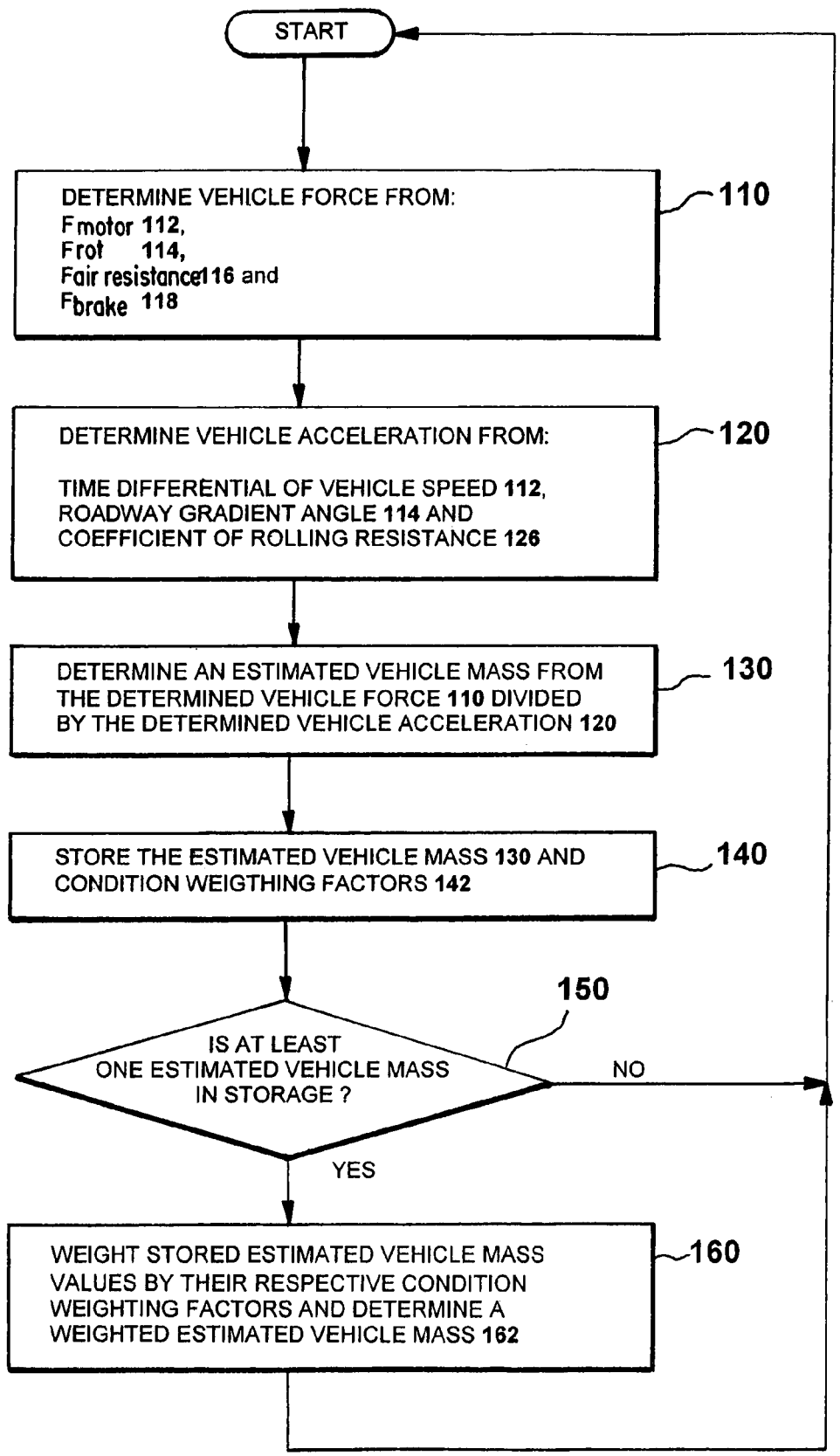
FIG. 1 is a flow chart illustrating an embodiment of a method in accordance with present invention.

Pursuant to the invention practically all of the vehicle driving conditions can be used for an evaluation particularly of a collective approach with the help of this which the vehicle mass can be identified. In particular it is not only possible to take a positive acceleration in the (horizontal) plane but rather a negative acceleration, i.e. a brake application, into account. In particular an evaluation with the influence of a slope descending force should also be possible, i.e. when the vehicle is not moved in the (horizontal) plane but rather uphill or downhill. Preferred methods for determining the correct incline or the correct decline, i.e. the gradient angle in relation to the horizontal plane, are illustrated further below. FIG. 1 is a flow chart illustrating an embodiment of a method in accordance with the present invention, including element numbering corresponding to the element numbers in the following paragraphs.

With the assistance of the so-called collective approach the vehicle mass or a value representing it can always be calculated when a virtually stationary condition exists for at least a short period of time, in particular one with essentially constant vehicle acceleration—here this signifies also the acceleration of the vehicle in the geodetic vertical direction. Through this a multitude of values obtained for the vehicle mass are made available within a short time and in particular without the vehicle mass having undergone any notable change. These values can be further processed suitably, in the simplest case they can be averaged, to obtain a relatively exact estimation value for the vehicle mass.

To increase the quality of the determination process result different driving conditions that are weighted in different degrees can be included in the determination of the collective calculated vehicle mass. For example driving conditions in which the vehicle experiences a positive acceleration, at least with a completely retracted drive unit, i.e. when it shows no excessive friction losses and therefore has reached its normal efficiency, will be taken into account with a higher weighting than braking operations, in particular when the amount of the coefficient of friction between the brake disc and brake lining is questionable for example due to on high temperatures. Conversely, the result obtained from a positive acceleration caused by the drive unit that is not yet fully retracted is weighted lower than for example a result for the vehicle mass obtained by a positive vehicle acceleration that results from a slope descending force.

Therefore during weighting basically factors can also be taken into account such as the operating temperatures of the drive unit and the transmission, which influence the efficiency in connection with other influencing parameters. Another aspect with weighting can be the respective driving situation because the reliability of the estimation can vary depending on the allotted evaluation timeframe and occurring vertical, horizontal as well as perpendicular dynamics. Other factors that influence the weighting are the turning radii and the use of driving dynamic control systems.

The total vehicle mass can be estimated in detail based on the following approach:

$$F = m \cdot a_{\mathit{eff}} = F_{motor} - F_{rot} - F_{air\ resistance} - F_{rolling\ resistance} - F_{gradient} - F_{brake}.$$

wherein "F" stands for a force, "m" represents the vehicle mass and "$a_{\mathit{eff}}$" is the effective vehicle acceleration. The drive force of the vehicle drive unit is "$F_{motor}$" 112, the effective rotational forces are contained in "$F_{rot}$" 114 and the vehicle's air resistance is taken into account in the amount "$F_{air\ resistance}$" 116. The rolling resistance of the vehicle is included in "$F_{rolling\ resistance}$" in the above approach, while a slope descending force is taken into account in the term "$F_{gradient}$" and the respective braking force is taken into account through "$F_{brake}$" 118.

A conversion of the above approach results in the following:

m 130=$(F_{motor} - F_{rot} - F_{air\ resistance} - F_{brake})$110/(dv/dt+g[-]·sin(β)+g·$c_{roll}$)120, wherein the time-related differential 122 of the vehicle speed "v" replaces the acceleration "$a_{\mathit{eff}}$", "$c_{roll}$" reflects the rolling resistance coefficient of the vehicle 126 and "g" stands for the acceleration due to gravity (9.81 m/s$^2$). Like the latter, the rolling resistance coefficient "$c_{roll}$" is considered constant (and primarily independent of the type of tire that is used). The angle β finally specifies the gradient angle of the roadway 124 and therefore represents the slope descending force or the force "$F_{gradient}$", in fact both with a positive inclination as well as with a decline if a negative value is set for β.

The novel idea with this approach as opposed to the familiar state-of-the-art is that depending on the driving situation the gradient resistance as well as the braking force are determined and stored 140 and taken into account and that in addition different driving situations are used for safeguarding other results (if no prior estimated mass values have been obtained, at least one additional estimated mass value must be obtained before evaluating estimated mass values from different driving situations, as indicated in step 150). A greater accuracy and reliability of the mass estimation of a vehicle than in the familiar prior art can be obtained through the evaluation 160 of as many occurring situations as possible and if necessary subsequent varying weighting (by means of suitable weighting factors 142) of more or less favorable driving situations. Therefore it is proposed to compare the respectively best results from as many measurements as possible with each other and to obtain a better result for the vehicle mass (weighted estimated vehicle mass 162) from these observations.

Concerning the effective forces based on the above collective approach, the driving force "$F_{Motor}$" for several currently built passenger vehicles can now be queried through the electronic onboard system. The tractive force of the drive unit can be calculated as follows:

$$F_{Motor} = ((MD\_Ind - MD\_Fric) \cdot MD\_Norm \cdot n_{total} \cdot eta_{total})/r_{wheel},$$

with

MD_Ind: actual torque of the drive unit [for example in % of the maximum value]

MD_Fric: loss of torque [for example in %]

MD_Norm: max. torque of the respective unit type $n_{total}$: total gear ratio=$n_{Transmission} \cdot n_{RA\text{-}Transmission}$ $eta_{total}$: efficiency level for transmission and rear axle transmission and $r_{wheel}$: radius of vehicle wheels, wherein for exact measurements the so-called tire expansion as a function of the vehicle speed can be taken into consideration.

If the vehicle is equipped with an automatic transmission, in general a special onboard system signal exists, which contains information on the respectively current gear ratio with a current efficiency level, wherein the efficiency of a transmission depends e.g. on the torque that is to be transmitted, on the input speed as well as of the operating temperature. The most important parameters here are known from characteristic diagrams. With a differential it is a known fact that efficiency decreases additionally with torque distribution so that the highest efficiency is achieved when driving straight ahead on a horizontal road.

The rotational forces "$F_{rot}$" of the above-mentioned approach can be obtained by estimating the respectively valid gear ratios and moments of inertia. For the acceleration of rotating masses, the following force must be applied:

$$F_{rot} = T_{total} \cdot (dv/dt)/r^2,$$

wherein the overall moment of inertia $T_{total}$ is composed of the individual moments of inertia, multiplied by the square of the respective gear ratio, i.e. for example:

$$T^{total} = T_{wheel} + T_{RA\text{-}Transmission} \cdot i_{RA\text{-}Transmission}^2 + T_{Motor} \cdot i_{transmission}^2 \cdot i_{RA\text{-}Transmission}^2$$

The moments of inertia in the drive train are known for various types of vehicles; deviations due to different tire dimensions and wheels are negligible. The value for $T_{total}$ is calculated in different ways as a function of the algebraic sign of the torque of the drive unit (driving or pushing operation).

The air resistance or the corresponding force $F_{resistance}$ is known for the vehicle as a measure or can be calculated with the help of the known air resistance coefficient, the known vehicle front surface as well as the current vehicle speed; here possibilities for larger errors can be excluded through a limitation to a lower speed range (e.g. to below about 70 km/h). This also avoids errors due to roof luggage racks or head wind or tail wind in the higher speed range since it is known that the force is proportional to the square of the speed "v".

In this context it should be pointed out that the air resistance of the vehicle can certainly be determined from driving dynamics. For example during a mountain descent at high speed without additional braking forces and very low torque of the drive unit, it is primarily only the air resistance that "brakes" and the value can be compared to the target value. This effect should occur over an extended period of time and also in all directions, i.e. without disturbances or head wind. This then also allows e.g. roof loads to be detected or it is in general possible to adapt the $c_w$ value to other driving situations and to draw furthermore a very rough conclusion of the center of gravity of the motor vehicle.

Incidentally the restriction to a lower speed range suggested two paragraphs earlier has the additional advantage that in this speed range also the rolling resistance is roughly constant and thus almost independent of the possible equipment with series tires of the vehicle/passenger car. Incidentally a clearly elevated rolling resistance caused for example by snow on the road can be detected by comparing wheel speeds among the individual wheels. This would then for example be a case where an above-mentioned weighting factor is supposed to be set at a very low value for the corresponding mass determination.

In this context it should also be mentioned that an evaluation of sufficiently long transmission shifting breaks at a relatively low vehicle speed, during which no driving force "$F_{Motor}$" is applied, permits an albeit rough, but generally sufficiently accurate statement of the sum of current rolling and air resistance values, particularly with knowledge of the slope descending force, i.e. the roadway inclination (uphill or downhill), so that an appropriate value can be stored for subsequent calculations. Incidentally the cut-off frequency of low-pass filtration of the wheel speed signals can be adjusted to the situation that is to be evaluated, which with reduced accuracy also enables an evaluation of relatively brief driving situations.

As far as the slope descending force "$F_{Inclination}$" of the above collective approach resulting from the inclination resistance (or from a decline, i.e. generally from a roadway inclination in the driving direction) is concerned, the roadway uphill or downhill inclination can be determined relatively accurately by means of the longitudinal acceleration sensor that is installed in the vehicle. Such a longitudinal acceleration sensor can determine the vehicle's acceleration occurring in the horizontal direction. From the change in speed of the vehicle wheel speed then on the other hand an acceleration of the vehicle occurring in the roadway direction can be easily determined. If now these two determined acceleration values (which can be negative or positive) are related to each other, then this allows the roadway inclination in the driving direction (upward or downward inclination) to be determined easily and thus the above-mentioned inclination angle $\beta$.

The accuracy of this result can be increased if additionally the pitch angle of the vehicle body in relation to the chassis, which can be determined with the help of a suitable sensor system, is taken into consideration. An appropriate sensor system is already used in the production of all vehicles/passenger cars, which are equipped either with a pneumatic suspension system or with xenon headlights. With the help of this sensor system, the pitch angle error can be compensated with the inclination signal. This is recommended particularly in the case of comfortably adjusted vehicle suspension with respect to reliable inclination detection, while this is not required for a very hard spring adjustment.

In particular through the possibility of taking a roadway inclination explicitly into consideration, further clearly increased improvement over the known prior art can be achieved. To this end, this inclination detection can be implemented relatively inexpensively. Once the inclination is known, depending on the current driving situation conclusions of other parameters of driving resistance are possible. Errors of the inclination signal due to strong chassis tension during acceleration on large inclinations can be detected and can thus be avoided. An evaluation of the so-called inclination signal is recommended especially with longer virtually stationary driving situations since an occurring phase offset between vehicle acceleration and the pitch angle can lead to errors.

A greater benefit of the inclination evaluation furthermore consists of the fact that driving situations with very low acceleration can also be evaluated; with large inclinations, even driving situations with constant driving speeds can be evaluated. This is due to the fact that the evaluation of smaller accelerations in the plane leads to large uncertainties even after a smoothing of the speed signal. Additionally, longer driving situations in the suitable speed range can be evaluated reliably during pushing operations only in connection with an inclination signal.

As far as the braking force of the above-mentioned collective approach is concerned, it can be determined from the force between the brake lining or the brake piston displacing it and the appropriate brake disc or the like. When taking the relevant coefficient of friction into consideration, the braking force that is applied on the wheel can be determined, from which the respective braking torque on the brake disc and thus on the respective wheel can be deduced and which results in the desired braking longitudinal force value, which in the above collective approach is described as the "braking force". The approach for this braking force thus reads:

$$F_{brake}=4 \cdot p \cdot (1/r_{wheel}) \cdot (A_{K,FA} \cdot \mu_{FA} \cdot r_{fric,FA} + A_{K,RA} \cdot \mu_{RA} \cdot r_{fric,FA} + r_{fric,RA}),$$

wherein "p" is the hydraulic braking pressure, $r_{wheel}$ is the radius of the vehicle wheel (possibly as a function of the vehicle speed v), $A_{K,FA}$ or $A_{K,RA}$ is the surface of the brake piston beneath the front axle or the vehicle rear axle, $\mu_{FA}/\mu_{RA}$ is the coefficient of friction on the front axle or rear axle, and $r_{fric}$ is the radius of the respective brake disc friction ring. Here one more factor for the efficiency of the brake on the front axle (FA) and the rear axle (RA) can be taken into consideration, which is normally in the range of 0.95 to 0.98. For more accurate estimates, a correction factor for the low loss in pressure in the brake system, such as for example through work performed on the piston-recuperating ring, can prove useful.

Especially with future electro-hydraulic brake systems, each wheel will have an exact pressure signal "p" in order to avoid distorted pulling of the brakes. Based on the above approach, from this the braking force can be determined relatively accurately because an estimate for the coefficient of friction of the wheel brake is available. The coefficient of friction μ depends on the brake temperature, the previous driving style and possible coatings on the brake disc or in general on the friction partners of the brake system.

Incidentally, with future novel brake systems, which are e.g. based on electro-mechanical systems, the braking force can be estimated from the adjusting force of the linings required there and their coefficients of friction. In alternative brake systems as well, such as eddy current brakes or retarders, a braking force can be estimated so that in general the braking force can be estimated from current operating data by means of the brake system(s) available on the vehicle.

Incidentally, when taking the braking force into consideration, driving situations that would lead to inaccurate or incorrect results can be excluded, for example with the help of the above-explained weighting or an appropriate weighting factor. For example it can be taken into consideration when presumably the brakes are hot or overheated or when the vehicle is in the beginning phase of a braking operation in which for example first a dry braking process of the brake disc occurs, and the like.

This way only longer-term fluctuations of the coefficient of friction have to be taken into consideration. In order to get a handle on them, a vehicle's mass can be assumed from usable evaluations of accelerations operations (without braking force) or braking path estimates. From a subsequent braking process, which fulfills the framework conditions for usable signal quality, then the brake's coefficient of friction is estimated. This also allows braking operations in the comfort range to be evaluated for a mass estimation.

Hereby it does not matter based on above-described equation whether the driver has disengaged the clutch or not. For manual transmissions and automatic transmissions, the onboard system has information available anyhow as to whether a transmission of forces occurs between the drive unit and the vehicle driving wheels or not, so that this always allows the amount of rotational forces to be estimated. Compared to the braking force, this amount is almost negligible anyhow at higher speeds or notable retardation. The coefficient of friction of the brake thus is stored as a starting value for the next trip of the vehicle. Clear changes, such as e.g. the installation of a new brake or a rust layer on the brake friction partners, can be safely detected when braking at low driving speed. It should be mentioned in this context that for example within the framework of a vehicle inspection the value of the vehicle mass can be measured and be input into the system. During a subsequent brief test drive the friction coefficient of the brake can be determined reliably and be stored.

The described evaluation of braking operations supplies usable results already in the comfort range so that evaluations of braking processes close to the intervention threshold of control systems (ABS or the like) with non-negligible slippage values is not useful. Additionally, apart from the exact braking force distribution between the vehicle axes the unknown coefficient of friction between the tires and the roadway would have to be taken into consideration. With a limitation to the so-called comfort braking range, thus the braking force can be determined from the respective braking pressure when taking an estimated coefficient of friction between the brake lining and the brake disc or the like into consideration so that preferably only braking operations without notable slippage between the tire and roadway are taken into consideration.

Incidentally the braking force can also be determined from a comparison with the path covered during the braking operation, i.e. initially when braking in the comfort range without notable slippage it is possible to draw a conclusion of still open parameters through a comparison to the path signal, i.e. the path traveled during braking, specifically based on the following approach: $(0.5 \cdot m \cdot \Delta v^2 = \int F_{Brake} \cdot path)$.

In this context it should be pointed out that the appropriate path measurement can also occur without slippage via position determination from a vehicle navigational system, wherein upon reaching a sufficiently high resolution with such a navigational system, which can operate in particular also in a satellite-controlled fashion ("GPS"), even slippage correction for optimization of the estimated results from the braking operations is possible. Incidentally—alternatively or in addition to the method described above—a sufficiently accurate vehicle navigational system also allows the respective roadway inclination to be determined or the current roadway inclination (above-mentioned angle $\beta$) is known from the navigational system. This information can then be used to adjust the inclination signal in the vehicle and possibly correct it. With knowledge of the exact roadway inclination it is furthermore possible in connection with an estimated mass value obtained in the plane to draw rough conclusions of the current center of gravity of the motor vehicle in the incline or decline as long as the vehicle chassis adjustment (individual spring characteristics) from the vehicle onboard system is known.

Overall thus several, but at least two estimated mass values that are essentially independent from each other are available (the presence of at least two values being determined, for example, at step 150 of FIG. 1), which considerably increases the reliability of the appropriate signal when taking the boundary conditions over the known prior art into consideration. For example a first estimated mass value can be determined within the framework of a longer constant acceleration in the horizontal plane, e.g. when entering a highway. For example a second estimated value for the vehicle mass when traveling on a constant roadway inclination (in special cases without associated speed changes) can be determined. And for example a third estimated value for the vehicle mass when braking with, in special cases, constant retardation can be determined. All these and additional estimated values can be suitably taken into consideration, possibly weighted differently and suitably compared to each other in order to obtain as accurate a result for the mass of the vehicle as possible.

Incidentally, depending on the signal quality of the driving force estimation, an offset of the estimation from the braking operation or vice versa for travel can be corrected. This mutual correction is beneficial since e.g. an error in the driving torque of the drive unit of only 5% leads to a deviation in the mass estimate of about 150 kg for a traditional passenger car. Similar tolerances also apply to the brake friction coefficient for the evaluation of retardations. The best adjustment possibility results from a driving situation without braking even only briefly in a larger descent with only little driving torque because here only constant gravity acts as an accelerating force and other parameters from the drive unit and brake are almost negligible.

The estimated mass values obtained this way can be made plausible with additional signals that are available in the onboard system of the vehicle. For example a vehicle cannot be lighter than the sum of its empty weight plus the fill levels of liquids plus a minimum weight of the vehicle driver. By means of seat occupation detection additional passengers or also children's seats can be taken into consideration. Similarly it can be detected easily in the onboard system whether a trailer is being pulled. However in this case only a rough value for the total mass of the towing vehicle-trailer unit can be estimated because all characteristic values of the trailer can be dispersed over a wide range. The difference from this result and an estimation of the vehicle weight composed of empty weight, fill levels and seat occupation information supplies in the case of acceleration measurements in the low speed range at least a rough signal for the mass of the vehicle trailer.

With the help of this data it is also possible to obtain a rough correction factor for the air resistance and the rolling resistance at higher vehicle speeds. A consideration of the steering angle or of data of the vehicle navigational system permits serious errors due to tail wind or head wind to be avoided. Incidentally an evaluation pursuant to the invention when traveling tight curves is at least currently not useful due to several additional influencing parameters. The significant factor is that the described mass estimation is performed continuously, i.e. can be ongoing, such that the frequency maximum minus detectable offsets corresponds the most likely value of the vehicle mass.

What is claimed is:

1. A method for determining the mass of a motor vehicle, comprising the steps of:
   determining a vehicle acceleration from at least a time differential of vehicle speed, a slope descending angle and a rolling resistance coefficient;
   determining vehicle forces, wherein the vehicle forces include
      a driving force of a vehicle drive unit,
      resistance forces resulting from rotational forces and air resistance, and
      a braking force;
   dividing the vehicle forces by the vehicle acceleration to obtain a vehicle mass value,
   obtaining a plurality of vehicle mass values from a plurality of driving situations;
   storing each of the plurality of vehicle mass values, and
   determining a collective mass value from the stored plurality of vehicle mass values, wherein the plurality of vehicle mass values obtained from the plurality of driving situations are weighted differently.

2. The method of claim 1, wherein
in the step of determining vehicle acceleration, the slope descending angle determination includes determination of a roadway inclination from a relationship between an acceleration in the roadway direction determined by at least one longitudinal acceleration sensor installed in the vehicle, and a component of the acceleration in the roadway direction normal to a gravity direction.

3. The method of claim 2, wherein
the component of the acceleration in the roadway direction normal to a gravity direction is determined from a satellite-based navigation system.

4. The method of claim 2, wherein
a vehicle body pitch angle is considered in determining the slope descending angle.

5. The method of claim 1, wherein
the braking force is estimated from operating data from a brake system installed in the vehicle.

6. The method pursuant to claim 5, wherein
the braking force is determined from a braking pressure and an estimated coefficient of friction between a brake lining and a brake disc.

7. The method of claim 5, wherein
the operating data from the braking system is obtained when braking without slippage between vehicle tires and the roadway.

8. The method of claim 6, wherein
the operating data from the braking system is obtained when braking without slippage between vehicle tires and the roadway.

9. The method of claim 1, wherein
the braking force is determined from an evaluation of a path traveled during a braking operation.

10. The method of claim 2, wherein
at least one of the roadway inclination and the path traveled during a braking operation is determined from a vehicle navigational system.

11. The method of claim 1, wherein
detectable offsets in at least one of the vehicle acceleration, driving force of a vehicle drive unit, resistance forces resulting from rotational forces, air resistance, rolling resistance and the slope descending angle are corrected prior to obtaining the vehicle mass value.

12. The method of claim 1, wherein
plausibility controls are provided.

* * * * *